(No Model.) 2 Sheets—Sheet 1.
H. FATIC.
CANE OR CORN HARVESTING MACHINE.
No. 411,798. Patented Oct. 1, 1889.
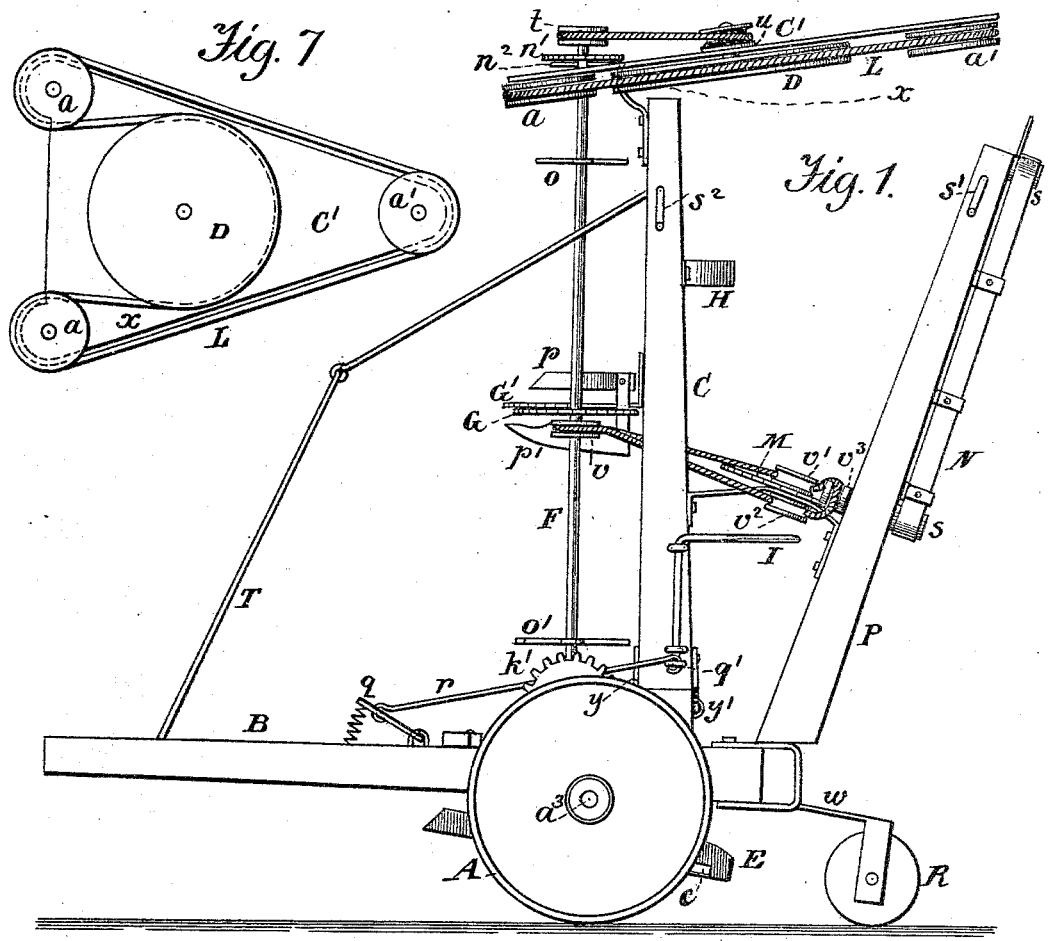
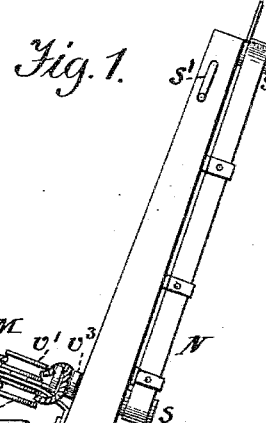
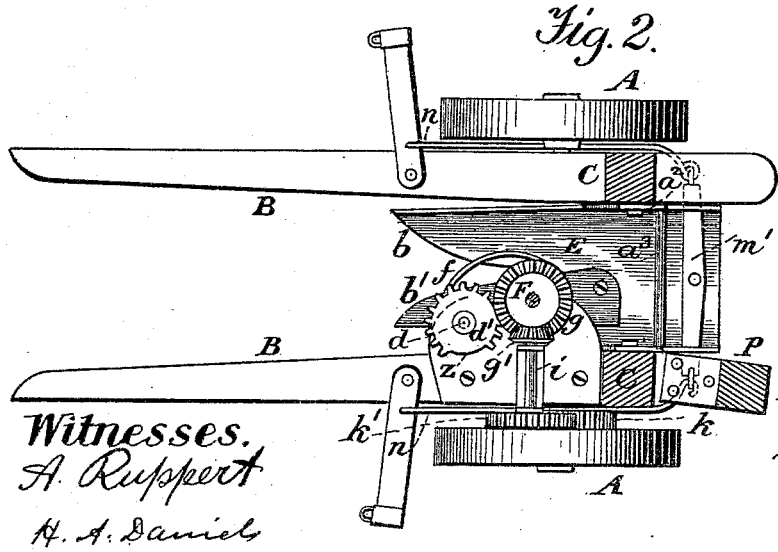
Witnesses.
A. Ruppert
H. A. Daniels
Inventor.
Henry Fatic
Per
Thomas P. Simpson
Atty

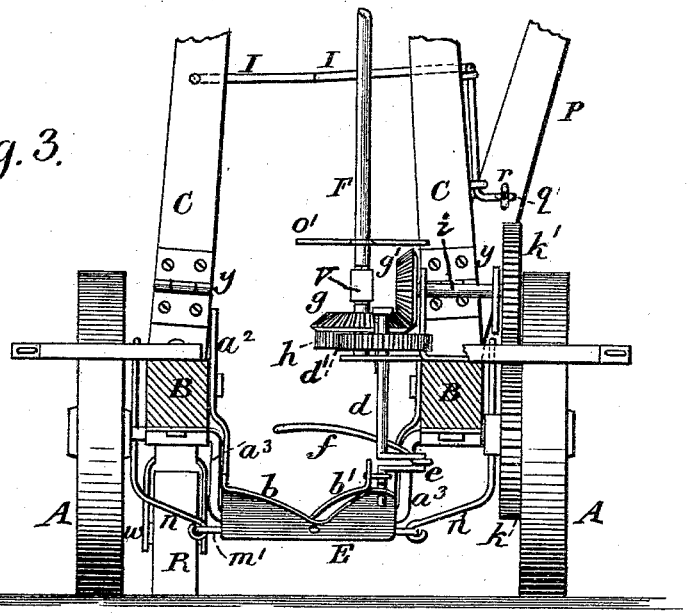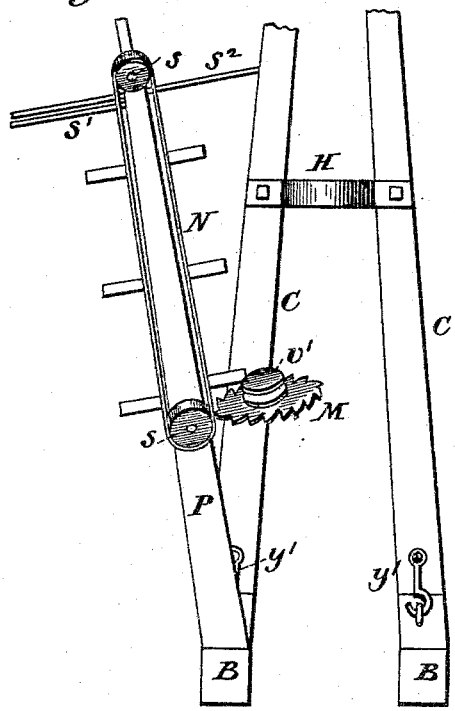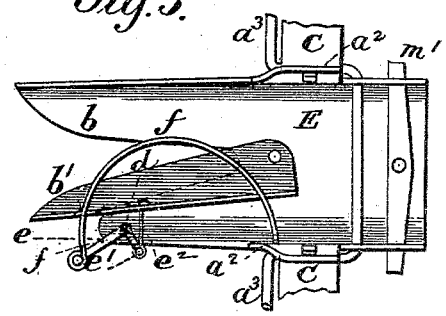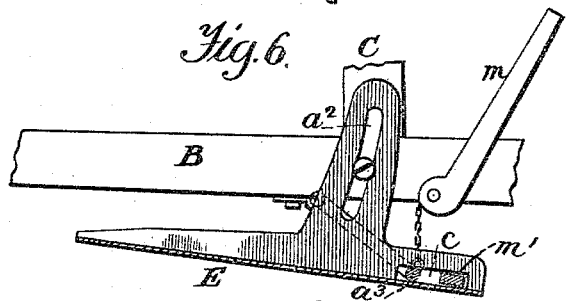

UNITED STATES PATENT OFFICE.

HENRY FATIC, OF MIDDLETOWN, INDIANA.

CANE OR CORN HARVESTING MACHINE.

SPECIFICATION forming part of Letters Patent No. 411,798, dated October 1, 1889.

Application filed July 6, 1889. Serial No. 316,719. (No model.)

*To all whom it may concern:*

Be it known that I, HENRY FATIC, a citizen of the United States, residing at Middletown, in the county of Henry and State of Indiana, have invented certain new and useful Improvements in Cane and Corn Harvesting Machines; and I do hereby declare the following to be a full, clear, and exact description of the invention, such as will enable others skilled in the art to which it appertains to make and use the same.

This invention relates to cane and corn harvesting machines; and it consists in certain improvements in the construction of the same, as hereinafter described and claimed.

In the accompanying drawings, Figure 1 represents a side view of a harvester provided with my improvements. Fig. 2 is a plan view of the platform, cutter, and other details. Fig. 3 is a partial front view. Figs. 4 to 7 are detail views of certain parts.

A designates the two main supporting-wheels of the machine, and B the draft-poles or shafts, which extend to the rear and form side beams of the frame.

On the beams B are mounted the posts C, to the tops of which is secured a frame C', which is somewhat triangular in form and which carries two forward pulleys $a$, a rear pulley $a'$, and a larger central pulley D, for the purpose hereinafter set forth.

E indicates a platform, which is provided with slotted arms $a^2$, which are adjustably secured to the side beams, so that the platform may be raised or lowered. The axle $a^3$ of the wheels A is secured to the side beams and the wheels turn on said axle, which has a crank form which extends downward and rearward and passes through slots $c$ in flanges of the platform. The said platform carries the cutter, which is formed of two blades $b$ and $b'$, which extend forward in position to cut the cane or stalks of corn, the blade $b$ being fixed to or a part of the platform and the blade $b'$ being pivotally connected with the platform. Near one of the side beams is supported a vertical shaft $d$, which is provided with a crank $e$, which extends forward when not in motion, and a shorter crank $e'$, which extends from the shaft at a right angle with the crank $e$. The pivoted blade $b'$ is connected by a rod $e^2$ with the crank $e'$, the said blade being actuated by the movement of said crank. A trigger $f$ is formed of a bent wire or rod one end of which is connected with the crank $e$, the other end of the rod being loosely connected with the platform at one side of the same. The said trigger extends over the cutter in position for contact with the standing cane or stalks as the machine is drawn forward.

F indicates a vertical shaft the lower bearing of which is carried by a side beam, the said shaft extending upward to the top of the machine, in which the upper end of the shaft has bearing.

On the shaft F, near its lower end, is a beveled gear-wheel $g$, under which and on said shaft is placed a gear-wheel $h$, the wheel $g$ being in position to be engaged by a beveled pinion $g'$ on a horizontal shaft $i$, to which rotary motion is imparted from one of the wheels A through a gear-wheel $k$, which is on the hub of said wheel A, and a gear-wheel $k'$ on said shaft $i$. The gear-wheel $h$ is intended to intermittently engage a mutilated gear-wheel $d'$, which is on the shaft $d$, which during operation is intermittently rotated, as hereinafter stated. The mutilated gear $d'$ carries a key which extends into a groove in said shaft $d$, the said gear being allowed a sliding movement on the shaft, so that the platform may be raised as desired.

The raising or lowering of the platform is effected by means of a pivoted lever $m$, which is connected with the axle $a^3$.

A doubletree $m'$ is pivoted to the platform at its rear end just back of the axle. To each end of this doubletree is attached a rod $n$, which extends forward and is connected with an arm or a half-whiffletree which is pivoted to a draft-pole or shaft B for hitching the draft-horses.

On the vertical shaft F and about midway of the same is fixed a cutter G, which rotates with the shaft, and a cutting-blade G' is fixed to a post C in relative position with the cutter G so that the stalks, when in contact with said cutters, are cut into two parts at the middle. Another rotary cutter $n'$ is fixed to the shaft F at its upper end and cuts off the tops of the stalks at the same time. Two reels $o$ and $o'$, formed of radial arms or blades, are fixed to the shaft F, one being near its upper and the other near its lower end, to catch the stalks and move them backward.

A curved arm P is fixed to a post C near the rotary cutter G, the purpose of said curved arm being to guide the upper-half parts of the cut stalks into a chute H, which is fixed to the posts C, so that the upper parts of the stalks fall into position with the lower parts. A fixed arm $p'$ under the cutter G presses the lower parts of the cut stalks to the chute and out of the way of the falling upper parts. The stalks being cut in two are more readily brought together and handled, and as the upper parts drop straight to the platform they fall, together with the lower parts, against the curved arms I, which extend from the posts C.

When the cut stalks have accumulated on arms I enough for a bundle, the arm I on the left side is opened or swung out and the stalks fall out to the left side of the machine. This movement of said arm is effected by means of a spring-pedal $q$, placed on a shaft and coupled thereto. The said left arm I is hinged to a post C, and a short arm $q'$ extends from the hinged end of the arm and is connected by a rod $r$ with the pedal $q$. When the driver wishes to discharge the bundle of stalks, he presses the pedal down with his foot, thus drawing the rod $r$, which opens the said arm and the stalks fall out to one side of the machine.

When it is desired to use the machine for cutting, topping, and loading corn, the cutters G G', the chute H, and arms $p$ $p'$ and I are removed, such parts being removably secured to the machine, and the stalks are cut, as before described, by the main cutter $b$ $b'$, the tops being cut off by the cutter $n'$ and the cutting-edge $n^2$ at the top of the machine. An endless cord or belt L passes about the pulleys which are carried by the upper frame C', said cord passing from the rear pulley $a'$ forward to and about the front pulleys $a$, and from thence rearward and about the large pulley D. As will be seen, the top cutter $n'$ is near one of the pulleys $a$, and as soon as the tops are cut off the upper ends of the stalks are caught between the endless cord and the large pulley D, which by its rotation carries the suspended stalks around with it. As the stalks are carried around, their lower parts are caught by a reel M, by which they are thrown to an elevator N, formed of an endless belt, which passes over pulleys $s$, and, being carried up over the elevator, fall on an arm $s'$, and at the same time the stalks are released at $x$ from the cord running on the large pulley D, the upper parts falling on an arm $s^2$, and a wagon or other receptacle being placed by the machine the stalks fall therein from said arms $s'$ $s^2$. Motion is imparted to the pulleys about which the cord L passes from the shaft F through a pulley $t$ at the upper end of said shaft and a pulley $u$ on the short shaft or pin which carries the large pulley D. The reel M, and also the elevator N, are driven from shaft F by means of a pulley $v$ on said shaft, a pulley $v'$, which is fast on the shaft of the reel, a loose pulley $v^2$ under the reel, and a pulley $v^3$, which is on the shaft of one of the pulleys $s$, carried by the elevator-standard P. As the machine moves forward, the blades $b$ $b'$ being in position to straddle the stalks of corn the latter press the trigger $f$, connected with the crank $e$, as before stated. The trigger in turn presses the long crank $e$ around rearward, partly rotating the shaft $d$. The short crank $e'$, following the movement, is turned around to the front and actuates the pivoted blade $b'$ and the stalks of a hill are cut. Just as the stalks are cut the crank $e$, extending rearward, now presses the trigger against the lower parts of the stalks, pushing them out of the way, thus preventing them falling between the cutter-blades. The shaft $d$, having made one revolution, stops rotating until it is again started by the next hill of corn coming in contact with the trigger. This stoppage in the rotation of shaft $d$ is caused by the gear-wheel $h$ ceasing to engage the mutilated gear $d'$, as in the rotation of $d'$ the cut-out Z comes opposite the teeth of wheel $h$; but as soon as the next hill is reached the trigger, coming in contact with the stalks and being pressed by them, turns the crank $e$, and thus partly rotates shaft $d$ and again brings the mutilated gear into engagement with the wheel $h$, and the cutting is effected as before.

R indicates a caster-wheel, which is connected with the rear end of one of the draft-poles by a metallic strip $w$, which is somewhat elastic to allow the draft-poles to be raised somewhat. The posts C are provided with hinged joints $y$ near their base, so that they may be turned down over the draft-poles when the loading mechanism is not used. When the posts are raised to their vertical position, they may be secured at the hinge-joints by hasps or hooks $y'$. The brace-rods T, which are connected with the posts, are provided midway with loose joints and may be folded when the posts C are turned down. The vertical shaft F has a joint at V, the joining ends being squared and fitted in a corresponding thimble, and the main upper part of the shaft may be removed before folding, after which the shaft may be replaced and secured in position.

I claim—

1. In a harvesting-machine for corn and cane, the combination, with a frame, of a platform provided with a cutter formed of two blades, one of which is pivoted, a vertical rotative shaft provided with two cranks, one of which is connected with said pivoted blade, a trigger formed of a bent rod which extends over the cutter and is connected with one of said cranks and with the platform, a mutilated gear-wheel on said rotative shaft, and mechanism to engage the same, substantially as and for the purposes described.

2. The combination, with a platform provided with the cutter having a fixed blade $b$ and a pivoted blade $b'$, of the trigger $f$, a vertical shaft $d$, provided with two cranks $e$ $e'$, one of which is connected with the trigger and the other with said pivoted blade, a mutilated gear-wheel $d'$ on shaft $d$, and driving mechanism to engage said gear-wheel, substantially as set forth and described.

3. The combination, with rope L and a frame provided with pulleys D, $a$, and $a'$, of an elevator provided with an endless carrying-belt and an intervening reel which is adapted to transfer stalks from said frame to the elevator, substantially as set forth and described.

In testimony whereof I have affixed my signature in presence of two witnesses.

HENRY FATIC.

Witnesses:
 PAUL FATIC,
 VIVIAN FATIC.